United States Patent [19]

Iwai

[11] Patent Number: 4,688,928
[45] Date of Patent: Aug. 25, 1987

[54] AUTOMATIC DUPLEX COPIER WITH CIRCULATING DOCUMENT HANDLER

[75] Inventor: Shiyougo Iwai, Yamatokoriyama, Japan

[73] Assignee: Sharp Kabushiki Kaisha, Osaka, Japan

[21] Appl. No.: 879,440

[22] Filed: Jun. 27, 1986

[30] Foreign Application Priority Data

Jun. 28, 1985 [JP] Japan ................................ 60-142775

[51] Int. Cl.⁴ ............................................. G03G 15/00
[52] U.S. Cl. ............................ 355/14 SH; 355/3 SH; 355/3 R; 355/23; 355/24
[58] Field of Search .................. 355/3 R, 3 SH, 14 R, 355/14 SH, 23, 24, 25

[56] References Cited

U.S. PATENT DOCUMENTS 4,561,772 12/1985 Smith ............................... 355/14 SH
4,589,765 5/1986 Perun et al. ...................... 355/3 SH
4,629,311 12/1986 Kaneko et al. ................. 355/3 SH X
4,634,265 1/1987 Tada ................................. 355/3 SH Primary Examiner—A. C. Prescott
Attorney, Agent, or Firm—Birch, Stewart, Kolasch & Birch

[57] ABSTRACT

An automatic duplex copying machine with a circulating document handler is characterized in that a plurality of single-sided-image bearing documents are piled on the circulating handler and a document page having been copied on a front side on a copy paper is sheltered in a copier-paper discharge path of the circulating document handler. Upon the occurrence of a paper jamming during copying another document page to be copied on the rear side of the copy paper, another document is sheltered into a document reverse tray of the circulating handler. The document with the front side page sheltered in the paper discharge path is forwarded into a document table, again, to conduct a supplemental copy. After that, the document with the front side page is sheltered in the document discharge path and the document with the rear side page is forwarded into the document table, again.

4 Claims, 13 Drawing Figures

AUTOMATIC DUPLEX COPIER WITH CIRCULATING DOCUMENT HANDLER

BACKGROUND OF THE INVENTION

The present invention relates to an automatic duplex copying machine and, more particularly, to an automatic duplex copying machine with a circulating document handler.

A new type of electrophotographic copying machine called an automatic duplex copying function is provided for making double-side copied papers through a process whereby a one-side copied paper sheet is stored within an intermediate tray and again led to a copying process portion after having been reversed in its transporting direction. The duplex copying machine, if coupled with a circulating document handler, is to automatically and successively makes a plurality of double-sided copy papers.

A paper jam may occur in this type of copying machine during copying of either side of the copy paper in particular, during copying the latter side of the page after the former side of the jammed paper has been copied. In such a case, the former-copied paper is removed, so that after removing the jammed paper, the former page in addition to the latter page must be copied again. It is therefore desired to provide an improved type of automatic duplex copying machine with a recirculating document handler for simplyfying the resumption of the further copying.

SUMMARY OF THE INVENTION

Accordingly, it is an object of the present invention to provide an improved automatic duplex copying machine for simplifying the recovery of a paper jam.

It is another object of the present invention to provide an improved automatic duplex copying machine with a circulating document handler for simplifying the resumption of a further copying operation upon a jam of the single-sided copied paper, so that the further copying operation can be done easily and the automatic duplex copying operations can be easily continued.

Briefly described, in accordance with the present invention, an automatic duplex copying machine with a circulating document handler is characterized in that a plurality of single-sided-image bearing documents are piled on the circulating document handler and a document page having been copied on a front side of a copy paper is sheltered in a copied-paper discharge path of the circulating document handler. Upon the occurrence of a paper jam during copying another document page to be copied on the rear side of the copy paper, the another document is sheltered into a document reverse tray of the circulating document handler, in which the document with the front side page sheltered in the paper discharge path is forwarded into a document table, again, to conduct a supplemental copying operation. After the supplemental copying operation, the document with the front side page is sheltered in the document discharge path and the document with the rear side page is forwarded into the document table, again, to conduct the rear side copying operation.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

Figure 3:
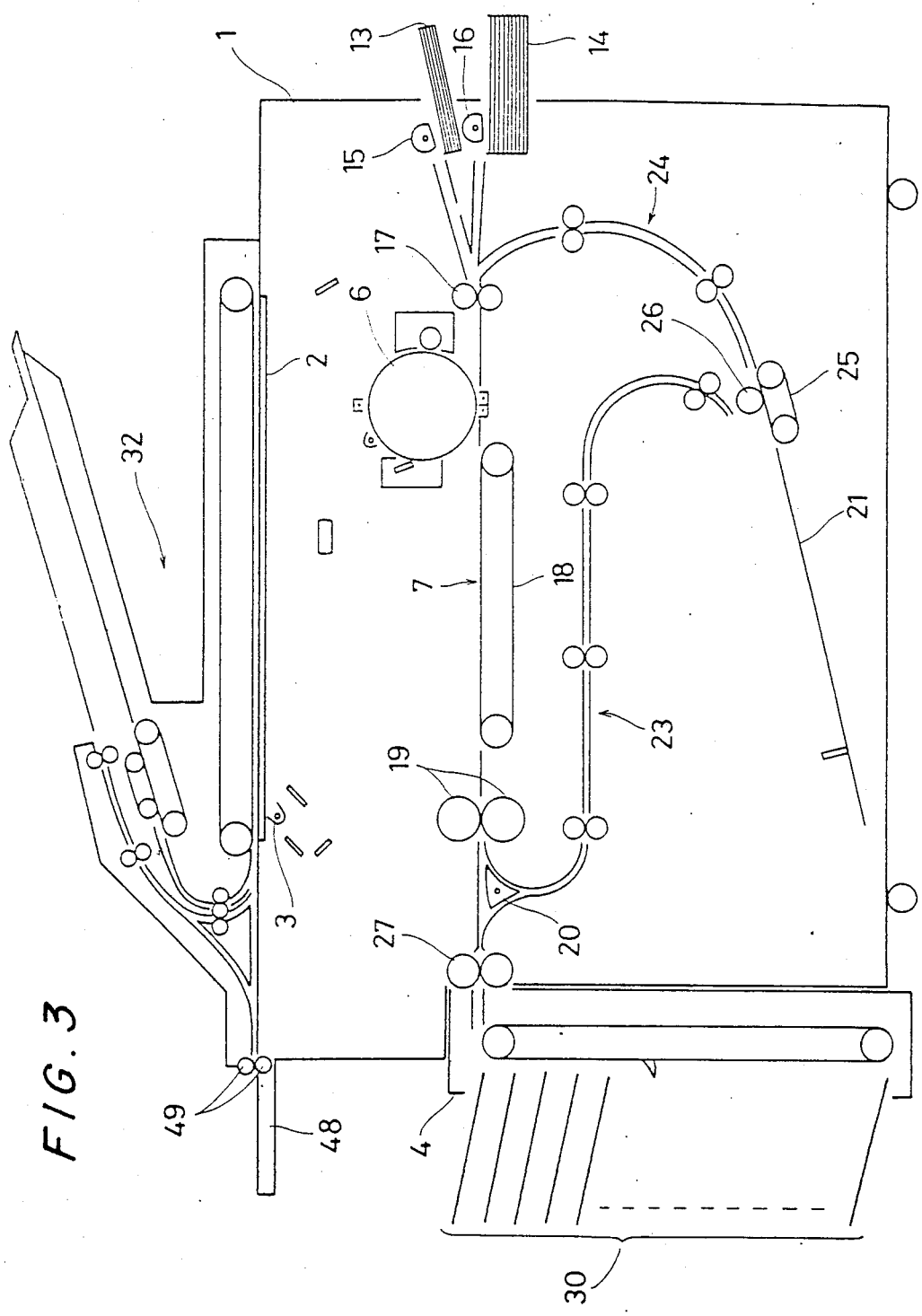
FIG. 3 is a cross-sectional view of the copying machine of the present invention.

FIG. 3 is a cross-sectional view of an automatic duplex copying machine of the present invention.

Referring to FIG. 3, the body 1 of the copying machine comprises a document table 2 on the top and a recirculating document handler 32 over the top of the machine.

Figure 2:
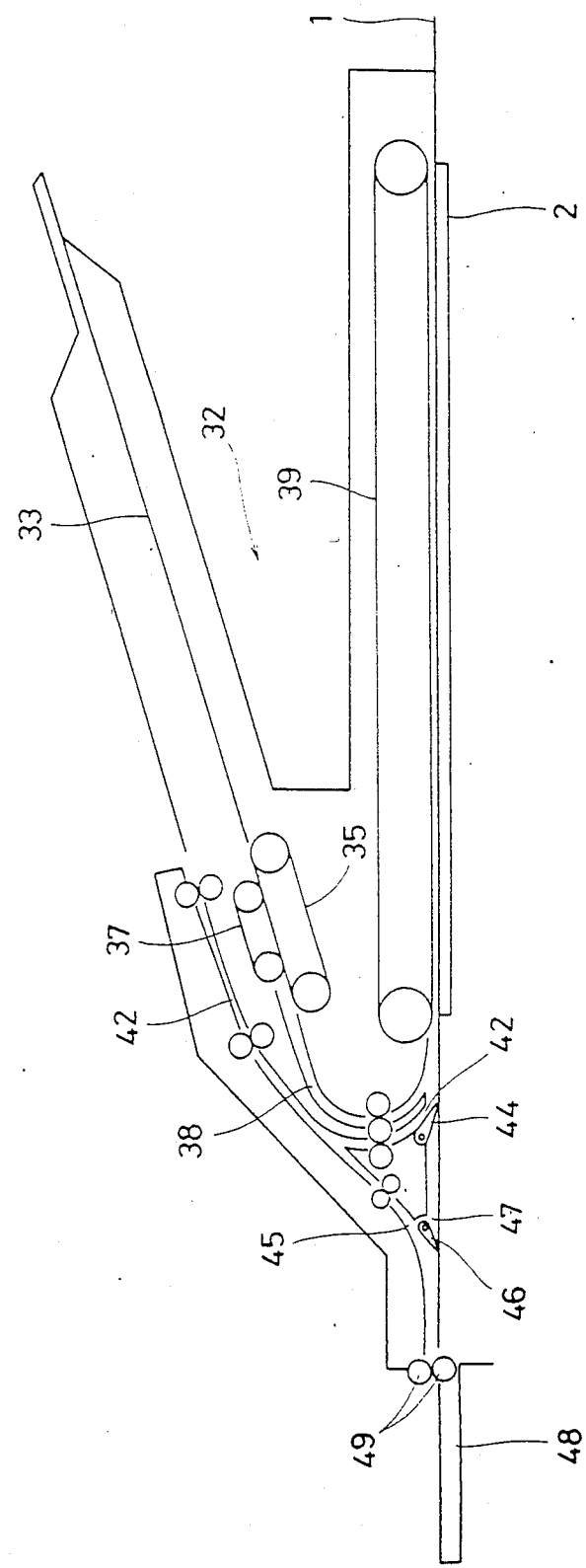
FIG. 2 is a cross-sectional view of a recirculating document handler used for the copying machine of the present invention.

FIG. 2 is a cross-sectional view of the recirculating document handler used for the automatic duplex copying machine of FIG. 2.

The document handler of FIG. 2 comprises a document reverse tray 48, a document shelter path 47 between the tray 48 and the document table 2, and a document reverse tray 45 between the document reverse tray 48 and a document tray 33. A change-over claw 44 is provided for selectively opening either a document discharge path 42 or the document storage path 47. Another change-over claw 46 is provided for selectively opening either the document storage tray 47 or the document reverse path 45. A pair of reversing rollers 49 are provided adjacent the document reverse tray 48.

To conduct the double-sided copy operation in connection with a plurality of double-sided-image documents piled on the document tray 33, each of the double-sided-image documents is forwarded from the document tray 33 to the document table 2. Without any actual copying operation, the document is led to the document shelter path 47 and the document reverse tray 48, and further to the document reverse path 45 and the document discharge path 42, thereby being finally led to the document table 2. After that, the actual copy operation is conducted to copy the document on the rear page. After the copy of the rear side of the double-sided-image document, the same document passes through the document shelter path 47, the document reverse tray 48, the document reverse path 45, and the document discharge path 42, so that the front page of the document is made face down and it is led to the document table 2, again. A single-sided copied paper is led again to the copying process to receive the front page image, after the traveling direction of the copied paper is reversed. The repetition of such operations automatically makes the double-sided copied papers, called the duplex copying herein, in connection with the double-sided-image documents.

Now back to FIG. 3, in the lower section of the document table 2, an optical system 3 is provided for optically scanning the documents mounted on the document table 2 to conduct the copying operation. At the lower section of the optical system 3, a photoreceptor drum 6 is provided with the various surrounding elements for constituting the copying means. Paper cassettes 13 and 14 are connected to the body of the machine at the right side. Paper pick-up rollers 15 and 16 are provided for picking up a single copy paper. A paper discharge roller 27 is provided at the left side of the body for discharging the copied paper. A PS roller 17, a paper transport belt 18, and a pair of fixing rollers 19 are provided to arrange a paper path 7 from the paper pick-up portion to the paper discharging section. A sorter 4 is coupled to the paper discharge section, comprising a plurality of bin stages 30 for serving as the sort function of the copied papers.

Below the paper transport path 7, an intermediate tray 21 is provided. Between the intermediate tray 21 and the portion in the paper transport path 7 after the fixing rollers 19, a duplex-copying path 23 is provided. A paper reverse path 24 is provided between the intermediate tray 21 and the front portion of the PS roller 17. Another change-over claw 20 is provided at the crossing between the paper transport path 7 and the duplex-copying path 23. It is moved to selectively open either the paper discharge path or the duplex-copying path 23.

Figure 1A:
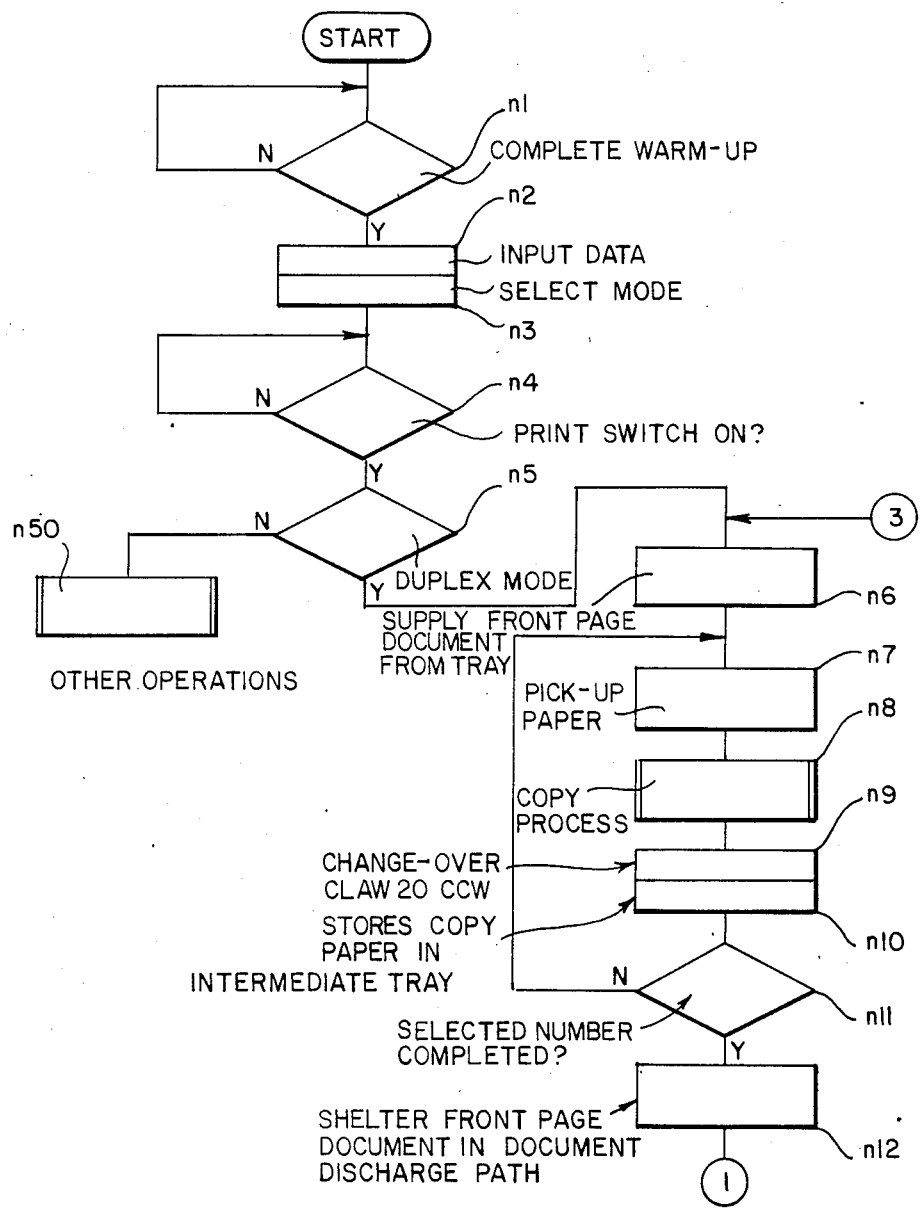
FIGS. 1(A) to 1(C) are flow charts of the operation of an automatic duplex copying machine according to the present invention.
Figure 1B:
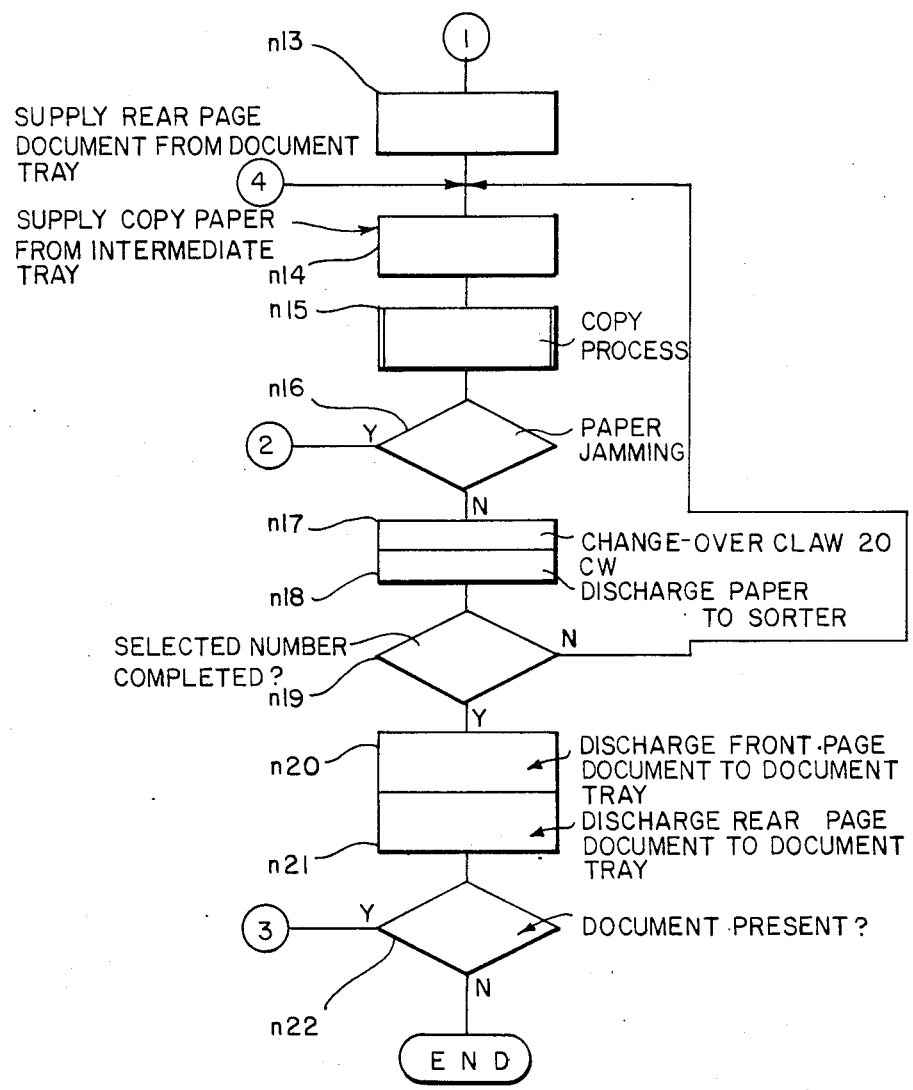
Figure 1C:
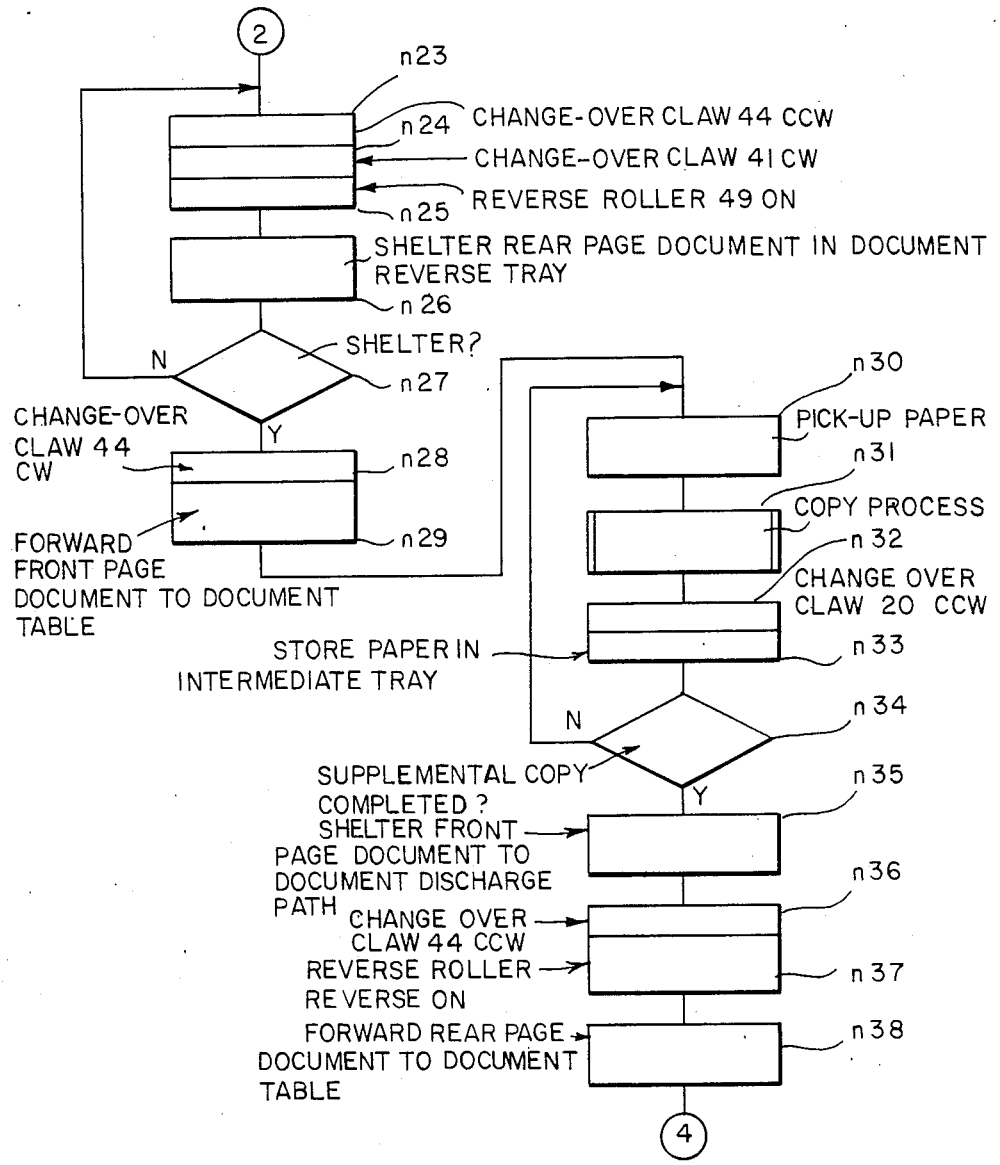

FIGS. 1(A)–1(C) are flow charts of the operation of the automatic duplex copying machine performing the following steps.

Step n1: A warm-up operation is carried out upon the application of power. The warming-up is completed.

Step n2: The data input is operated such as the copy paper number, the paper size, and the magnification ratio.

Step n3: The mode selection of either the single-sided copy mode or the double-sided copy mode (duplex mode) is operated by the operator.

Step n4: It is detected whether a print start switch is operated.

Step n5: This step is selected to detect whether the duplex mode is selected.

Step n50: If the duplex mode is not selected in step n5, step n50 is selected to carry out the remaining operations, such as, the single-sided copy operation in which the handler 32 serves simply as an automatic document feeder. This is called an "automatic document feeder mode" in which each of a plurality of documents are multi-copied to make single-sided copies and are then discharged.

Step n6: This step is executed by selecting the duplex mode in which the recirculating document handler 32 is activated to recirculate each of the documents after their multi-copies. A lowest paper of a plurality of documents piled on the document tray 33 of the document handler 32 is forwarded into the document table 2. Every document is piled face up on the document table 33. The following two processes are separated depending on the number of the documents inputted at step n2 or otherwise the number of the documents detected in a preliminary document-circulation of all of the documents piled on the document tray 33 prior to the execution of the actual copying operation. That is, when the number of the documents is odd, the lowest document of the documents piled is one to be copied in the front page of a copy paper, so that it is not suitable for the duplex copying operation and the normal single-sided copying operation is automatically selected. When the number of the documents is even, the lowest document is one to be copied in the rear side of the copy paper, so that the double-sided copy operation should be needed for copying both the lowest document and the second last document. Therefore, it is now assumed that the number of the documents piled on the document table 33 is even.

As stated above in connection with FIG. 2, every document is piled face up on the document table 33, so that the rear page of one document is copied on the front page of a copy paper. Such a rear page document is called a "front page document" for convenience herein while the document of the front page is called a "rear page document".

I. Front Page Document Copying Operation:

Step n7: One copy paper is forwared from the paper supply section to the copy process section.

Step n8: The copy operation is carred out. At this time, the change-over claw 20 is moved counterclockwise (CCW) to open the double-sided copying path 23 in order to forward a paper copied with the front page document into the intermediate tray 21.

Step n11: It is detected whether the selected number of copy papers have been finished. Step n7 is returned, if not, the operations of steps n7–n10 are repeated.

The above operations are the front page copying operations. A single-sided copy paper copied with the front page document is stored within the intermediate tray 21.

II. Rear Page Document Copying Operation:

Step n12: If the selected number of the documents have been copied in step n11, step n12 is selected to hold the front page document in the middle of the document discharge path 42, the front page document having been mounted on the document table 2.

Step n13: In step n13, the rear page document, which is presently mounted at the lowest position on the document tray 33, is forwarded into the document table 2 via the document path 38. The copy paper copied with the front page document is taken off the intermediate tray 21, being led into the PS roller 17 via the paper reverse path 24 with the operation of an intermediate paper supply belt 25 and an intermediate paper supply roller 26. In this step, the paper is traveled in the reverse direction.

Step n15: The copying operation is conducted.

Step n16: It is detected whether any paper jam occurs during the copying operation.

Step n17: When no paper jam occurs, step n17 is selected to rotate the change-over claw 20 clockwise (CW) in order to open the paper discharge direction and further discharge the double-sided copied paper into the sorter 4, and finally, into the bins 30.

Step n19: It is detected in step n19 whether the selected number of the copy papers have been completed. If not, step n14 is returned.

The above operations are the rear page document copying operations. The image of the rear page document is copied on a plain page of a single-sided copied paper stored within the intermediate tray 21, thereby being finally stored into the sorter 4.

Step n20: This step is selected by detecting the completion of making the selected copy papers in step n19. In step n20, the front page document waiting in the document discharge path 42 is discharged into the upper portion of the document tray 33.

Step n21: In step n21, the document mounted on the document table 2 is discharged into the upper portion of the document tray 33 via the document discharge path 42.

Step n22: It is detected whether an uncopied document is present on the document tray 33. If present, step n6 is returned to repeat the double-sided copy operations.

Step n23: Step n23 is selected if the paper jam occurs in step n16 for copying. After the jammed paper has been removed, the operator operates the print switch, so as to select step 23.

Step n23: A change-over claw 44 moves counterclockwise. Step n24: A change-over claw 41 moves clockwise. Step n25: A reverse roller 49 is activated. These three steps cause the rear side document mounted on the document table 2 to be sheltered in the direction of the document reverse tray 48.

Step n28: Step n28 is enabled after the storage of step 27 has been completed. In step n28, the change-over claw 44 moves clockwise to open the document discharge path 24.

Step n29: The front page document presently waiting in the document discharge path 42 is led to the document table 2.

Step n30: One paper is picked up and fed in.

Step n31: The front page document is subjected to the copying operation.

Step n32: The change-over claw 20 moves counterclockwise to open the path into the double-sided copying path 23. The copy paper is sheltered in the intermediate tray 21.

Step n34: The operations of steps n30–n33 are repeated to supplement the copy of the jammed paper by the number of which it is short. In step n34, it is detected whether the supplemental copying operation has been finished.

Step n35: This step is executed to keep the front page document on the document table 2 waiting in the middle of the document discharge path 42.

Step n36: The change-over claw 44 moves counterclockwise.

Step n37: The reverse roller 49 moves counterclockwise. With the operations of steps n36 and n37, the rear page document sheltered in the document reverse tray 48 is led to the document table 2, thereby returning to step n14.

FIGS. 4(A) through 4(H) are cross-sectional views, respectively, of the copying machine, showing the positions of the documents and the copy papers under control.

Figure 4A:
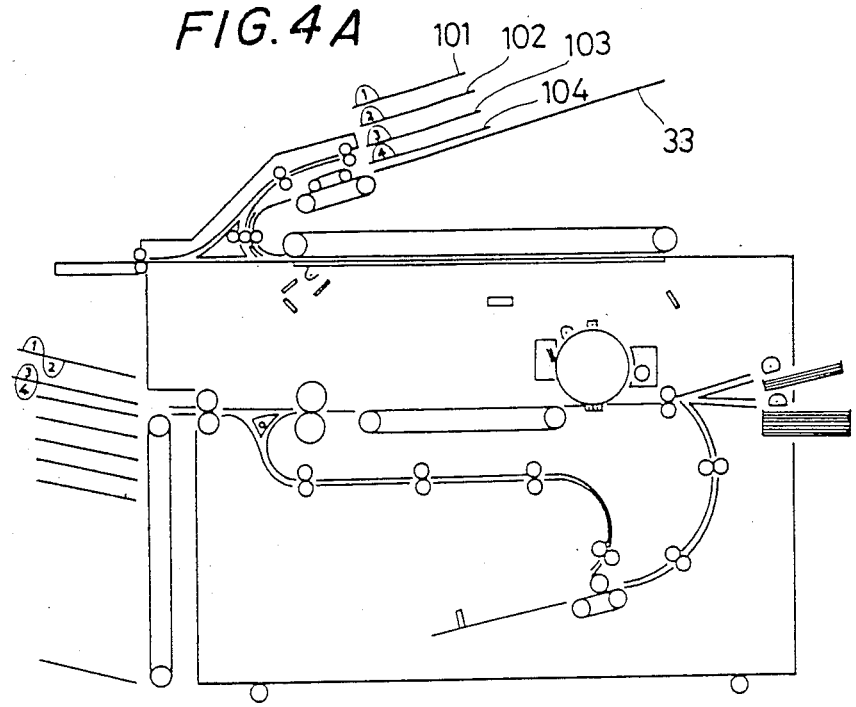
FIGS. 4(A) to 4(H) are cross-sectional views, respectfully, of the copying machine of the present invention, showing the operation of the copying machine.

FIG. 4(A): It is now assumed that prior to the start of the copying operations, an even number of sheets, for instance, four sheets of documents 101–104 are piled on the document tray 33. They have single-sided images and are piled on the table face up.

Figure 4B:
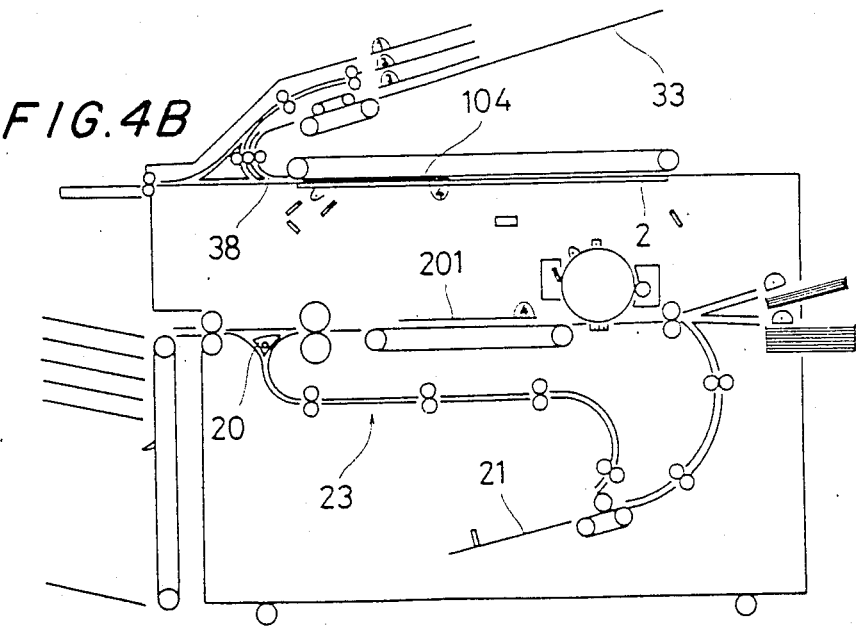

FIG. 4(B): When the lowest, fourth document 104 is forwarded into the document table 2 via the document path 38, a copy paper 201 is traveled into the copying process section to conduct the copying operation. This step corresponds to step n8 of FIG. 1(A) to carry out the front page copying operation.

Figure 4C:
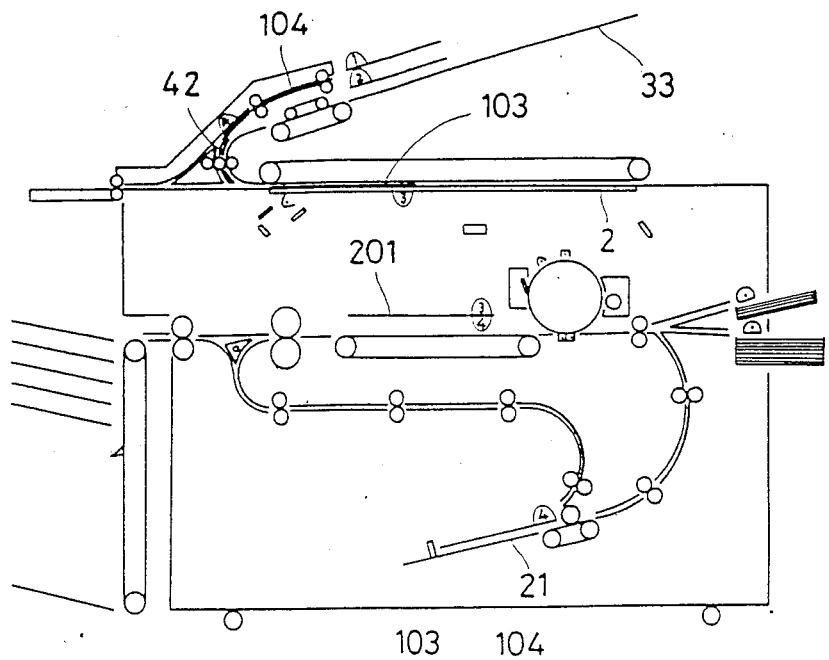

FIG. 4(C): After the necessary number of copies are made in connection with the fourth document 104, it is sheltered in the document discharge path 42. The third document 103 is next forwarded into the document table 2. In synchronization with the movement of the third document 103, the single-sided copied paper 201 with the image of the document 104 is taken off the intermediate tray 21, being finally led to the copying process. The third document 103 is copied on the rear side of the copy paper 201. This step corresponds to step n15 of FIG. 1(B) for copying the rear page.

Figure 4D:
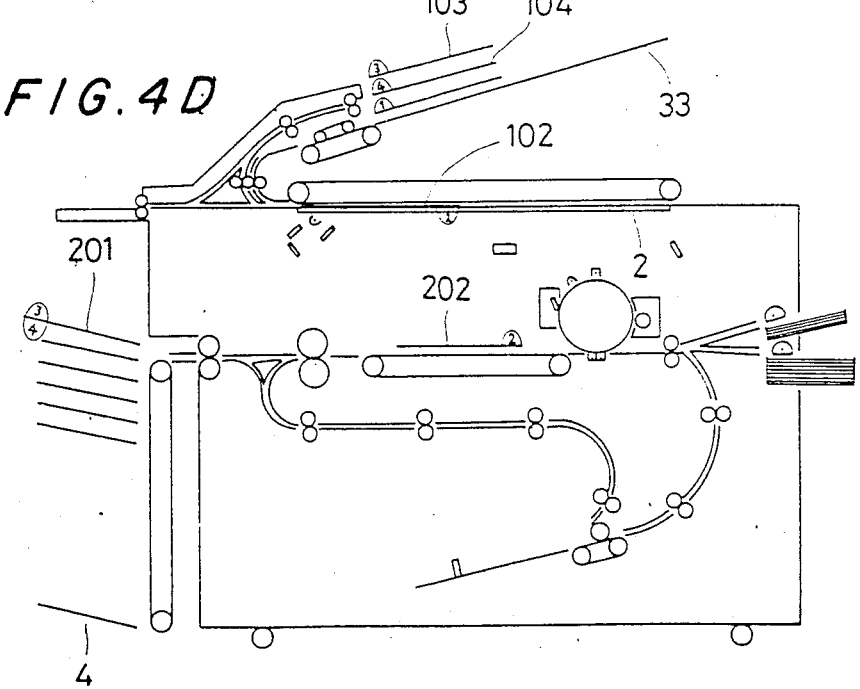

FIG. 4(D): After the multi-copies have been finished, they are discharged into the sorter 4. The documents 103 and 104 are discharged into the upper portion of the document tray 33. Next, the second document 102 is led to the document table 2 in order to make its copy. This step corresponds to step n8 skipped from step n22 of FIG. 1(B) to step n6 of FIG. 1(A).

Figure 4E:
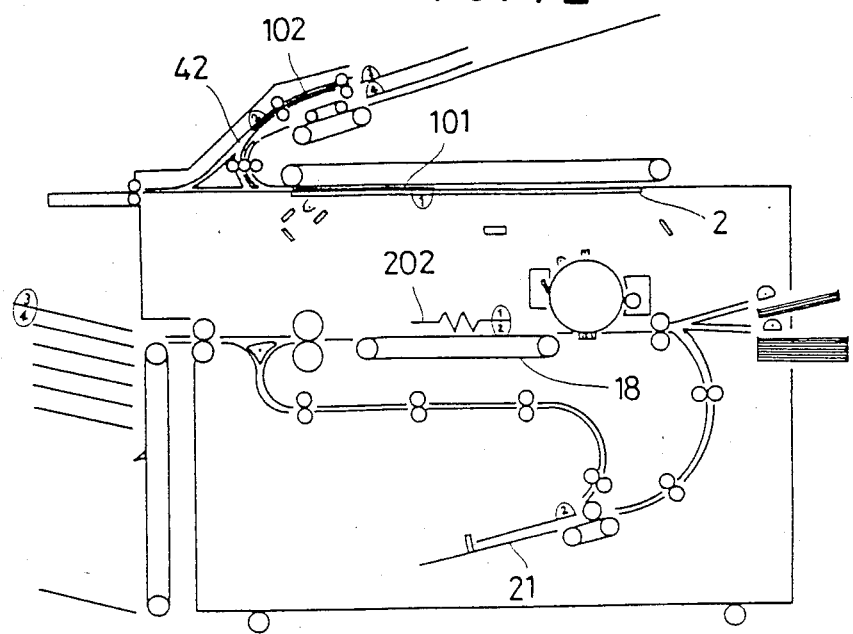

FIG. 4(E): After the multi-copies of the second document 102 have been finished, it is sheltered in the document discharge path 42. The first document 101 is on the document table 2. If a copy paper 202 fed to the copying process from the intermediate tray 21 is jammed in the transport belt 18 then the operation is advanced from step n16 of FIG. 1(B) to step n23 of FIG. 1(C).

Figure 4F:
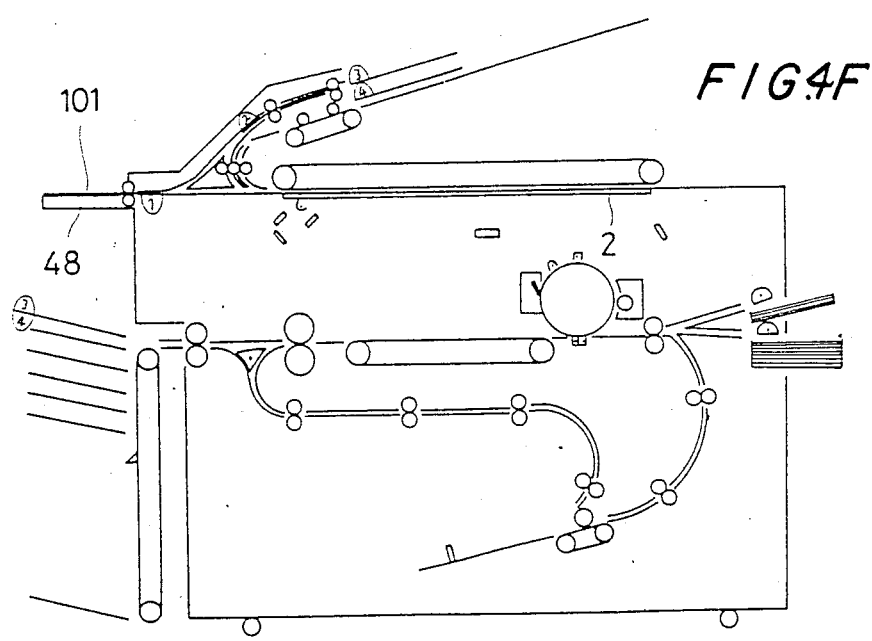

FIG. 4(F): The jammed paper is removed. The first document 101 is led to the document reverse tray 48 from the document table 2. This condition corresponds to step n27 of FIG. 1(C).

Figure 4G:
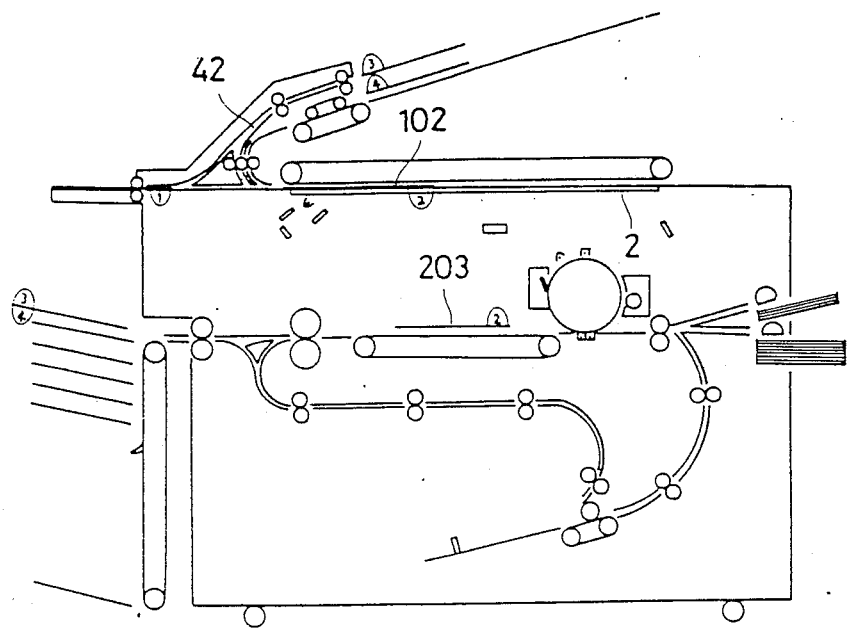

FIG. 4(G): The second document 102 sheltered in the document discharge path 42 is led to the document table 2, so as to copy its copy on a copy paper 203 fed from the paper feed section. This step corresponds to step n31 of FIG. 1(C) for supplementing the copy.

Figure 4H:
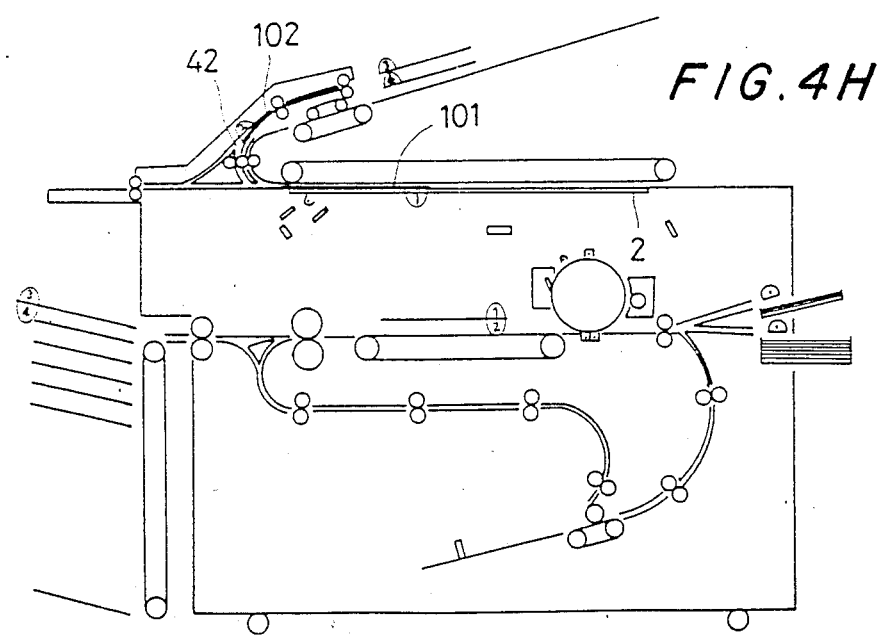

FIG. 4(H): After the supplemental copy, the second document 102 is sheltered in the document discharge path 42, again. The sheltered first document 101 is led to the doucment table 2 to continue the double-sided copy operation. This step corresponds to step n15 of FIG. 1(B) after step n38 of FIG. 1(C).

As described, in accordance with the present invention, the front page document is sheltered in the position of being able to come back to the document table while the corrsponding rear page document is under copy. When paper jamming occurs during copying the rear page document, the rear page document presently mounted on the document table 2 is sheltered into the document reverse tray, so that the front page document presently sheltered in the document discharge path can come back to the document table. After the supplemental copy for the front page document returning to the document table has been finished, the front page document is sheltered again in the document discharge path while the rear page document presently sheltered in the document reverse tray is led to the document table. Thus, the double-sided copy operation called the duplex copy can be easily continued. When paper jamming occurs in copying the rear page document, the front page document can be automatically returned and changed so as to facilitate the duplex copy.

While only certain embodiments of the present invention have been described, it will be apparent to those skilled in the art that various changes and modifications may be made therein without departing from the spirit and scope of the present invention as claimed.

What is claimed is:

1. An electrophotographic copying machine of the type in which at least two single-sided image bearing documents to be copied are circulated to rest on a document table for scanning, to make a double-sided copied paper bearing first and second images, comprising:

document circulating means for carrying the single-sided image bearing documents thereon and circulating the documents prior to arrival at the document table;

first shelter means for sheltering a first page document of the documents; and second shelter means for sheltering a second page document of the documents upon the occurrence of a paper jam in copying the second page document;

said first shelter means dispatching the first page document to the document table for supplemental copying;

said first shelter means further sheltering the first page document after the supplemental copying thereof;

said second shelter means dispatching the second page document to the document table to thereby carry out copying thereof.

2. The machine of claim 1, wherein the first shelter means is provided within a document discharge path through which the document is finally ejected outside said circulating means.

3. The machine of claim 1, wherein the second shelter means is provided in a document reverse tray through which the document is reversed.

4. The machine of claim 1, wherein the first page document is copied on a first page of the copy paper and the second page document is copied on a second page of the same copy paper.

* * * * *